Feb. 26, 1946.    J. SIMPSON    2,395,511
CAN FEEDING MECHANISM
Filed Aug. 17, 1944    2 Sheets-Sheet 1
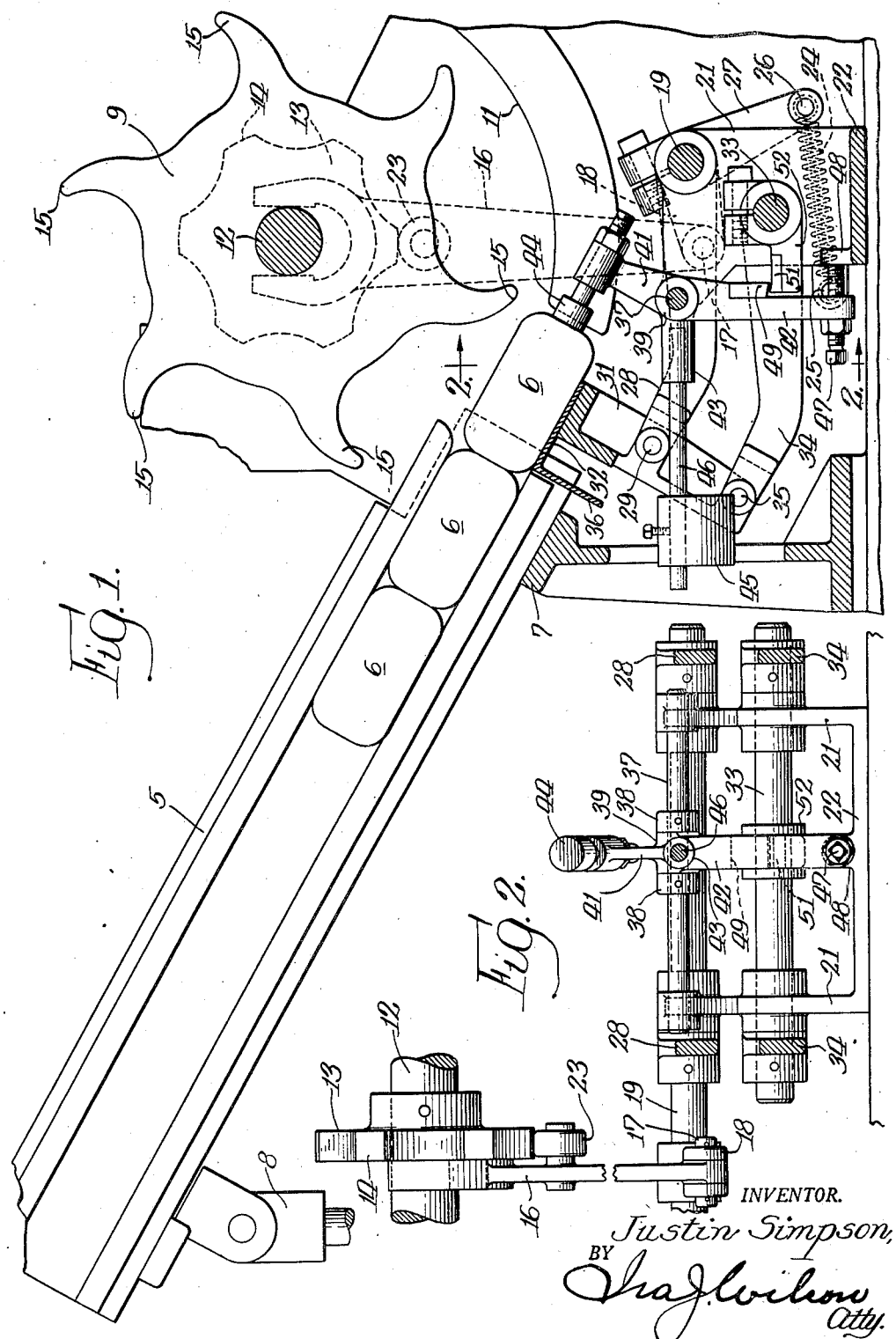
INVENTOR.
Justin Simpson,
BY Ira J. Wilson
Atty.

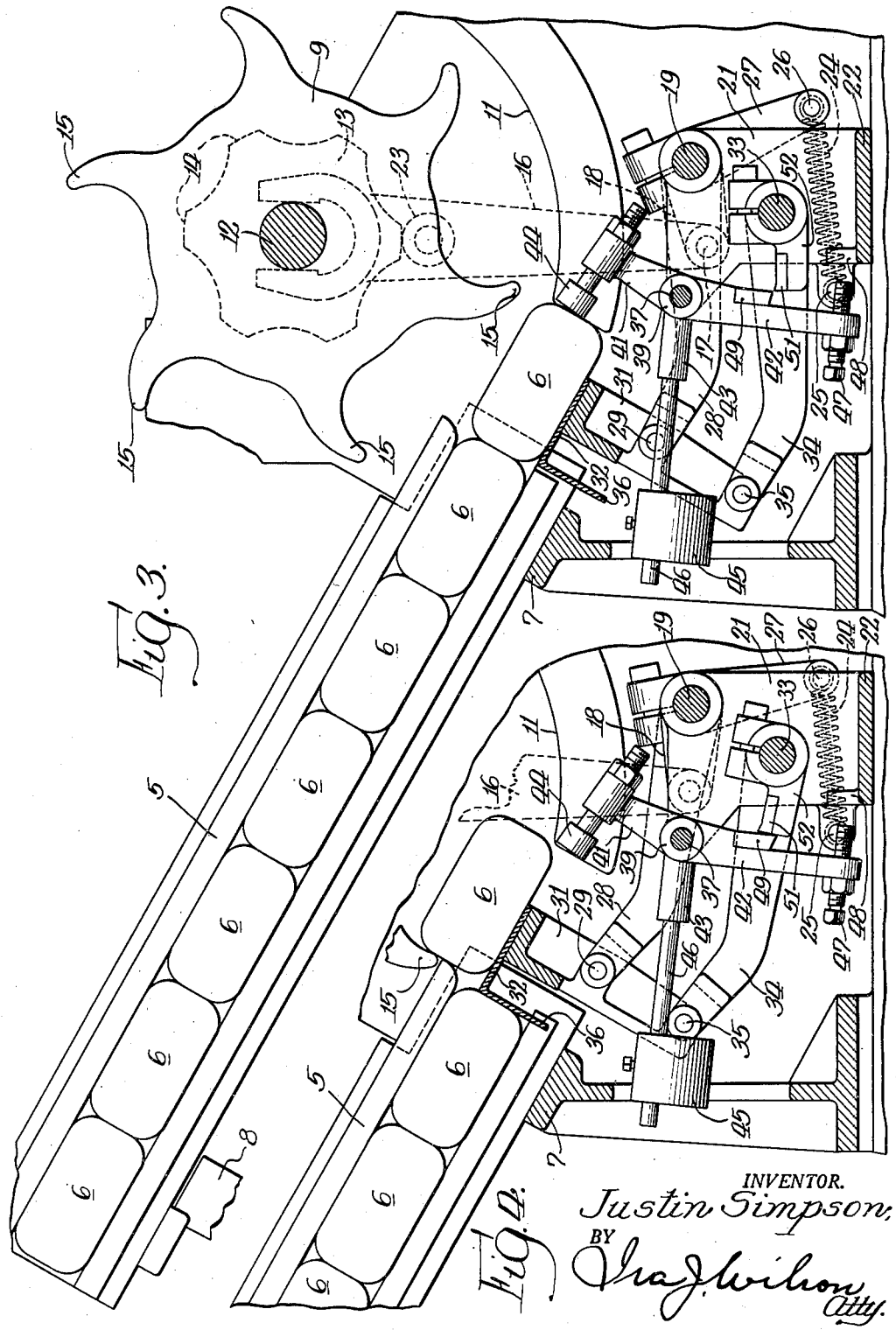

Patented Feb. 26, 1946

2,395,511

UNITED STATES PATENT OFFICE 2,395,511

CAN FEEDING MECHANISM

Justin Simpson, Elmhurst, Ill., assignor to Cameron Can Machinery Co., Chicago, Ill., a corporation of Illinois Application August 17, 1944, Serial No. 549,942

3 Claims. (Cl. 198—21)

This invention relates to feeding mechanisms and, while the principles thereof may be embodied in machines of various types, I have shown here for illustrative purposes my invention as embodied in a mechanism for feeding tin can bodies to a body testing machine.

In feeding mechanisms of the character disclosed the can bodies are propelled in succession along a chute to a point where they are transferred from the chute to a feeding device such for instance as a turret wheel adapted to feed the bodies successively in spaced apart relation to a machine in which they are operated upon. Unless bodies are delivered continuously to the chute and at least as fast as they are transferred therefrom by the feeding mechanism, a jam may be occasioned by the approach of a can to the delivery end of the chute at the same time the transfer device is moving across the chute. In this event the can becomes crushed between the transfer device and the wall of the chute or between the transfer device and a prong of the rotating turret wheel.

To obviate the possibility of the occurrence of such jams and to insure that the bodies will be transferred in proper timed relation to the movements of the turret wheel, my present invention is designed to render the transfer device inoperative whenever the number of bodies in the chute drops to a point where the pressure exerted by said bodies falls below a predetermined minimum.

With this end in view, my invention contemplates a feeler or detector at the delivery end of the chute against which the body next to be transferred presses to a degree depending upon the number of bodies in the chute exerting pressure upon the body to be transferred. If the pressure of the bodies against the detector is sufficiently great the operation of the transfer device is not interfered with and the bodies are transferred in succession and in proper timed relation to the turret wheel. Should the number of bodies pressing against the detector be diminished beyond a predetermined minimum by failure of the delivery of bodies to the chute, the detector will cause an obstruction or abutment to be interposed in the path of a moving part of the transfer device so as to obstruct and preclude movement of the device. When the normal number of bodies in the chute has been reestablished the detector serves to retract the abutment thereby permitting the resumption of normal operation by the transfer device.

The construction, operation and inherent advantages of my invention will be understood from the following description when considered in connection with the accompanying drawings.

Referring to the drawings:

Fig. 1 is a side elevation partially in section of a feeding mechanism embodying my invention.

Fig. 2 is a fragmentary view taken on the line 2—2 of Fig. 1.

Fig. 3 is a view similar to Fig. 1 showing the position of the detector and associated parts under the influence of a normal number of bodies in the chute, and Fig. 4 is a similar view of the parts during the transfer of a body.

Referring to the drawings more in detail, reference character 5 indicates generally a runway or, as it is more commonly termed, a chute, along which can bodies 6 or other objects are propelled. In the form shown, this chute is supported in inclined position by a portion of the machine frame 7 at its lower end, and an adjustable link support 8 at its upper end so that the bodies 6 will be propelled by gravity to the lower end of the chute as they are delivered to the chute from the body maker or other source of supply. It should be recognized, however, that in lieu of an inclined chute of the character illustrated, a horizontal chute having a movable belt forming its bottom may be employed for bringing the bodies to transfer position. The pressure exerted by the bodies upon the detector to be later described will vary with the number of bodies in the chute, whether the chute be of the inclined type illustrated or the belt conveyor type mentioned.

At one side of (in the present instance above) the delivery end of the chute is mounted a feeding device by which the bodies transferred from the chute are fed to a machine adapted to perform a subsequent operation upon the bodies. As illustrated, this feeding device consists of a turret wheel 9 having peripheral spaced apart prongs or fingers adapted to engage behind and feed along the track 11 the can bodies as they are successively transferred from the chute to the turret wheel. The turret rotates in a counter-clockwise direction, viewing Figs. 1 and 3, and in the form shown is adapted to deliver the bodies to a can tester by which they are tested for leaks, although obviously the character of the machine to which the bodies are fed is of no consequence so far as my invention is concerned, nor is the invention dependent upon the feeding of can bodies since other bodies or objects may be handled equally well by a feeding mechanism embodying my invention and modified as to details so as to be capable of adequately handling the particular type of body or object for which the machine may be designed.

The turret is rotated in a counter-clockwise direction from any suitable source of power not shown and upon the shaft 12 carrying the turret is fixedly mounted a cam wheel 13 provided with dwells 14 corresponding in number and position with the feed fingers 15 of the turret. A bar or link 16 bifurcated at its upper end to straddle the shaft 12 is pivotally connected at 17 with an arm 18 fixed on a rock shaft 19 which is journalled in the upwardly projecting legs 21 of the frame structure 22. A cam follower 23 mounted on the bar 16 is yieldingly urged toward and into engagement with the cam 13 by a tractile spring 24 attached at one end as at 25 to the frame 22 and at its other end as at 26 to an arm 27 fixed upon the shaft 19. The tendency of this spring to rotate the shaft 19 in a clockwise direction, viewing Fig. 1, biases the follower 23 toward its cam 13.

A pair of arms 28 is fixed at one end upon the shaft 19 and pivotally connected at 29 with a transfer device 31 carrying an angle shaped plate 32. A second rock shaft 33 journalled in the frame legs 21 has fixed thereon a pair of arms 34 which are likewise attached at 35 to the transfer device 31. The shafts 19 and 33 with the arms 28 and 34 connected respectively at 29 and 35 with the transfer device 31 form substantially a parallelogram which, when shaft 19 is rocked, causes the transfer device to move in a straight line substantially perpendicular to the longitudinal axis of the chute 5. In other words the transfer device 31 moves crosswise of the chute to transfer a body 6 from the chute to the feed turret 9. The angle plate 32 forms in effect a continuation of the lower wall of the chute so that the foremost can body rests upon this plate. The other angle 36 of the plate forms an obstructing wall which prevents movement along the chute of the bodies therein while the foremost body is being transferred as will be apparent from Fig. 4.

A shaft 37 journalled in the upright members 21 of the frame has journalled thereon between collars 38 a hub 39 of a lever consisting of the upwardly extending arm 41, the downwardly extending arm 42 and the laterally extending socket arm 43. The upper arm 41 has adjustably mounted thereon a feeler or detector member 44 disposed in the path of the bodies in the chute so that the foremost body will abut against the detector and tend to swing the lever in a clockwise direction. This movement is yieldably opposed by a weight 45 adjustably mounted upon an arm 46 carried by the socket arm 43.

The lower arm 42 of the lever is provided with an adjustable abutment screw 47 adapted to engage an abutment 48 on the frame 22 by which movement of the lever under the influence of the weight is limited. The lever 42 also carries a laterally projecting wear plate or abutment plate 49 adapted when the parts assume the position shown in Fig. 1 to overlie and be disposed in the path of a companion abutment plate 51 carried by a short arm 52 which is fixed upon the shaft 33 intermediate its ends.

When the chute contains an adequate number of bodies so that the pressure of the foremost body induced by gravity or by friction of the bodies with a belt conveyor is sufficient to rock the detector lever against the action of the counterweight 45 and retract the abutment 49 from the path of the abutment plate 51 as shown in Figs. 3 and 4, the operation of the transfer device will not be interfered with. The transfer device is moved upwardly, as shown in Fig. 4, to transfer the foremost body from the chute into the zone of operation of the feeding turret wheel 9, the flange 36 serving during such feeding movement to hold back the following bodies. Upward feeding movement of the device 31 is produced by the spring 24 which, acting through the arms 27 and 18, urges the link bar 16 toward the shaft 12 to maintain the follower 23 in contact with the cam 13. As this follower rides into a depression between successive dwells 14 the transfer of the leading body from the chute to the turret wheel is effected. Upon return of the transfer device 31 to its lowered position as the follower 23 rides up onto the next dwell of the cam, the bodies in the chute move forward causing the foremost body to exert a pressure upon the detector 44 proportionate to the number of bodies in the chute. So long as the number of such bodies exceeds a predetermined minimum the pressure will rock the detector lever to retract the abutment member 49 from the path of the abutment member 51 and the transfer of the foremost bodies from the chute in succession will proceed in the manner described and as illustrated in Figs. 3 and 4 of the drawings.

In the event however of the failure of a supply of bodies to the chute so that the number therein falls below the predetermined minimum determined by the setting of the weight 45, and which minimum we may, for illustrative purposes, consider as four bodies, the pressure of the remaining three bodies is insufficient to rock the detector lever against the action of weight 45, consequently abutment 49 overlies and is disposed in the path of the abutment 51. Under these conditions when a dwell 14 moves away from the cam follower 23, movement of the various parts including the arms 28, 34 and 52 under the influence of spring 24 is prevented with the result that the transfer device 31 remains idle in the position shown in Fig. 1 until the chute is supplied with sufficient additional bodies to rock the detector lever and withdraw abutment 49 from the path of abutment 51.

It will be manifest that the transfer of the can bodies from the chute to the feeding device is controlled by the detector mechanism which in turn is responsive to the number of bodies in the chute. The construction and operation insures that the transfer device will not operate unless a body is in transferring position in engagement with the detector. Any possibility of a body being projected partially across the path of the transfer device at the time the device is operated is therefore obviated.

The structural details shown and described as illustrative of the principles of my invention may obviously be varied within considerable limits without departing from the scope of my invention, as defined in the following claims.

I claim:

1. In a feeding mechanism for can bodies and the like, the combination of a rotatable turret, a chute adapted to contain a series of bodies, means movable transversely of the chute for transferring bodies in succession from the chute to said turret, said means comprising a pair of rock shafts, arms extending from said shafts in substantial parallelism, a transfer device carried by said arms, a lever fixed on one of said shafts, a spring acting on said lever for actuating the transfer device and an abutment carried by one of said shafts, and a control device comprising a pivotally mounted lever, a detector carried by one arm of said lever in the path of the foremost can in said chute, an abutment carried by another arm of said lever and means for biasing said control device to position said last named abutment in the path of the first named abutment to restrain the movement of said transfer device under the influence of said spring, said control device being movable under the influence of advancing can bodies in the chute to disalign said abutments and permit operation of the transfer device.

2. In a feeding mechanism, the combination of a turret to receive a series of can bodies or the like, a plurality of rock shafts, a plurality of arms carried by said shafts, a transfer device pivotally connected to said arms, spring means for actuating said arms to project the transfer device transversely of the chute whereby the foremost body in the chute is transferred to said turret, a cam rotatable with the turret, means operable by said cam for retracting the transfer device against the force of said spring, and means for preventing actuation of the transfer device by the spring when the number of can bodies in the chute falls below a predetermined minimum, said last mentioned means comprising a pivotally mounted lever, a feeler member carried thereby in the path of the foremost body in the chute, an abutment carried by said lever and adapted to be positioned in the path of an abutment movable with the transfer device and means for biasing said abutments into alignment whereby movement of the transfer device under the influence of said spring means is prevented, the abutment carried by the control device being movable into inoperative position by the pressure of the foremost can body upon said detector member when the number of bodies in the chute is sufficient to overcome the force of said biasing means.

3. In a feeding mechanism, the combination of a rotatable turret, an inclined chute adapted to contain a series of can bodies or the like, a transfer device movable transversely of the chute to transfer the foremost can body from the chute to the turret, a plurality of arms upon which said transfer device is carried, a spring for actuating said arm to project said transfer device across the chute, a cam rotatable with the turret, means operable by the cam for retracting the transfer device against the force of said spring, a control device comprising a feeler member in the path of advancing bodies in the chute, an abutment positioned to prevent movement of said arms under the influence of said spring, an arm connected with said abutment and with said feeler member, a weight adjustably mounted on said arm and tending to retain said abutment in operative position, an adjustable abutment limiting the weight induced movement, and means whereby the normal position of the feeler member may be adjusted.

JUSTIN SIMPSON.